United States Patent [19]
Petrov et al.

[11] Patent Number: 5,937,421
[45] Date of Patent: Aug. 10, 1999

[54] METHODS, SYSTEMS AND COMPUTER PROGRAM PRODUCTS FOR PERFORMING INTERACTIVE APPLICATIONS IN A CLIENT-SERVER BASED DIALOG SYSTEM

[75] Inventors: Tzvetan Petrov, Heidelberg; Hans-Jurgen Richstein, Schwetzingen; Holger Wittmann, Dossenheim, all of Germany

[73] Assignee: International Business Machines Corporation, Armonk, N.Y.

[21] Appl. No.: 08/914,495

[22] Filed: Aug. 19, 1997

[30] Foreign Application Priority Data

Aug. 19, 1996 [EP] European Pat. Off. ............. 96113274

[51] Int. Cl.$^6$ ...................................... G06T 1/00
[52] U.S. Cl. ............................................ 707/526
[58] Field of Search .................... 707/526, 500, 707/530

[56] References Cited

U.S. PATENT DOCUMENTS 5,754,771  5/1998  Epperson et al. .................. 395/200.33
5,768,510  6/1998  Gish .................................... 395/200.33

*Primary Examiner*—Mark R. Powell
*Assistant Examiner*—Alford W. Kindred
*Attorney, Agent, or Firm*—Myers Bigel Sibley & Sajovec; Jeanine Ray-Yarletts

[57] ABSTRACT

Page setup and page information content for documents are used to represent interactive applications in client-server communications. Accordingly, interactive applications are performed in a client-server based dialog system, including a client and a server which communicate with one another, by transmitting documents from the server to the client which represent the interactive applications and which are independent of the client system resources. At the client, the received documents are mapped to the client system resources to thereby perform interactive applications using the client system resources. Accordingly, client-server communications may take place for many different types of clients in a device independent and transfer optimized manner. Changes to the applications may be provided on the server only.

23 Claims, 3 Drawing Sheets

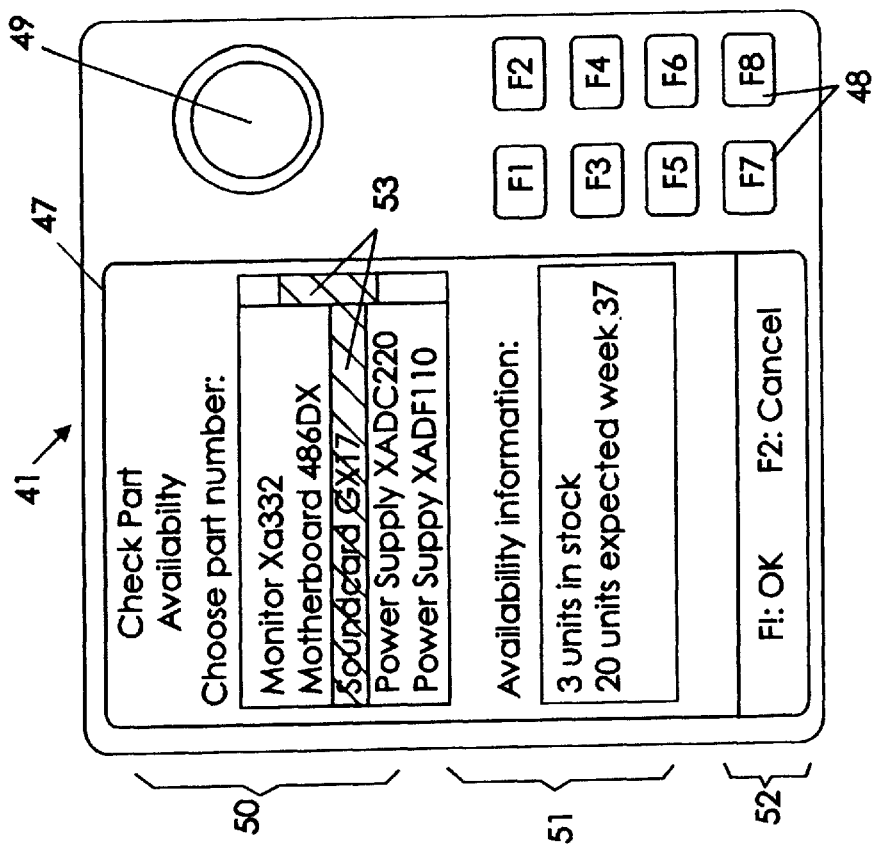
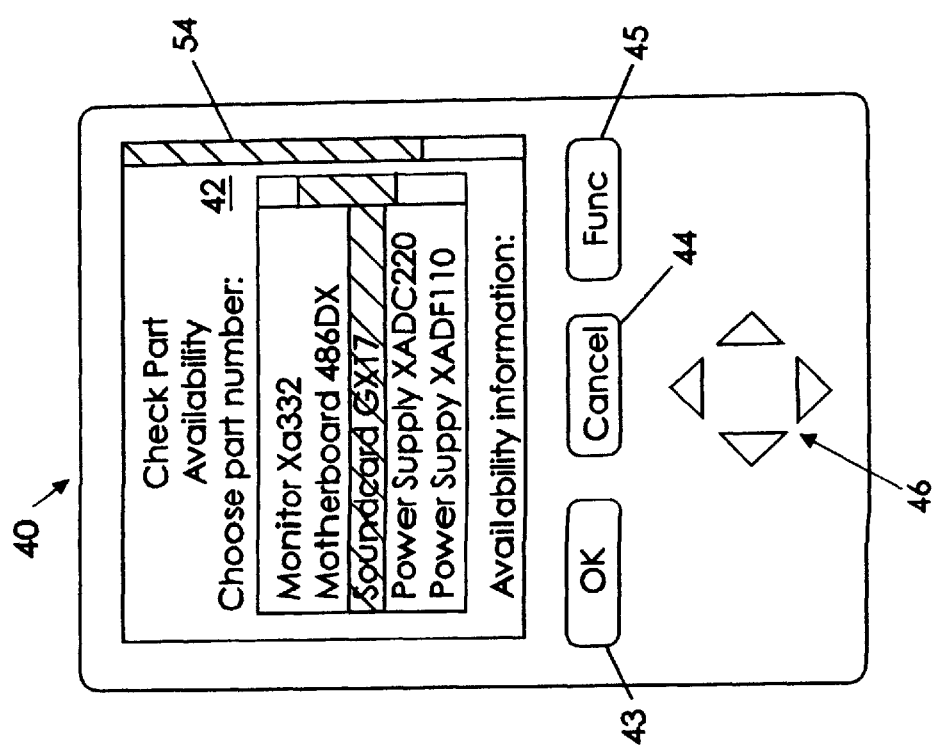
FIG. 4B
FIG. 4A

METHODS, SYSTEMS AND COMPUTER PROGRAM PRODUCTS FOR PERFORMING INTERACTIVE APPLICATIONS IN A CLIENT-SERVER BASED DIALOG SYSTEM

FIELD OF THE INVENTION

This invention relates to information processing methods, systems and computer program products and, more particularly, to client-server based methods, systems and computer program products.

BACKGROUND OF THE INVENTION

Client-server methods, systems and computer program products are widely used for communications between one or more servers and one or more clients in a communications network. One application of client-server methods, systems and computer program products is in mobile computing where a mobile client communicates with a server over a radio (wireless) network.

In mobile network computing, portable computers such as handheld, laptop (notebook), palmtop, or on-board computers in vehicles are generally used. Communication links are maintained between a portable end-device (client) and a stationary application server over a wireless telecommunication network. Unfortunately, mobile computing may limit many aspects of system performance.

For example, the performance of the common client hardware is often similar to the Disk Operating System (DOS) and thus the application software may be limited. Moreover, the system overhead which is used for communication with the server what may have a further impact on the overall performance of the mobile computing system. The display resources of currently used mobile computers also are generally limited compared with desktop computers or workstations. Moreover, those displays often include display formats which are significantly different from one another.

Currently used mobile computers also generally provide very limited and varying resources for user input/output of information. For instance, on-board computers used in the automobile industry often provide only a small number of simple input keys. On the other hand, other devices are provided with full keyboards. Any deficiencies may be balanced by emulation of a full function input device by driver software installed on the client side which is transparent to the applications.

Finally, the networks utilized for mobile computing may be very expensive to use. They may also provide low transmission rates.

Generic approaches in the field of conversational communication between a host mainframe computer, such as an IBM System/370, and peripheral Personal Computers (PCs), are known. Specific driver software installed at each client can enable a 3270 terminal emulation. Applications provided in these systems are generally not aware of the client's capabilities for enabling interactive dialogs with one or more users. Display resources of these clients, in addition, are generally classified into a limited set of terminal classes. The minimum display size is generally 80 characters per line and 24 lines with respect to one of those display classes. The applications are generally responsible for formatting dialog pages on the client side. The applications generally need to know the system resources for presentation of the application on the client side, and if necessary to configure the application. Therefore, the 3270 emulator approach may enable only uniform host communication (conversation) independent of the respective hardware platform provided on each client side.

Another generic communications approach is the HyperText Transfer Protocol (HTTP) communication protocol which, for example, is commonly used with the Internet. This protocol allows use of different hardware platforms on the client sides, utilizing only one unique protocol. However, the Internet generally is an information based system, and generally not a dialog based system. Thus, the Internet generally provides only a pool of information which can be browsed by a so-called "Web Browser". Moreover, the interactive provisions of these browsers generally are very restricted and generally concentrate only on the browsing mechanism and up- and downloading of information. Finally, the necessary system resources for implementation of these browsers are generally excessive with respect to mobile computer systems.

In mobile computing, existing portable computers generally use locally installed software and thus generally have restricted performance. Moreover, each change of application software generally must be installed on each of the clients, which can be costly, time consuming and error prone.

SUMMARY OF THE INVENTION

It is therefore an object of the present invention to provide improved methods, systems and computer program products for client-server communications.

It is another object of the present invention to provide methods, systems and computer program products which can allow device independent and transfer optimized dialogs in client-server based systems.

It is still another object of the present invention to provide methods, systems and computer program products for client-server communications which can allow changes to applications to be made only on the server side.

These and other objects are provided, according to the present invention, by using a page setup and page information content for documents to represent interactive applications in client-server communications. Accordingly, interactive applications are performed in a client-server based dialog system, including a client and a server which communicate with one another, by transmitting documents from the server to the client which represent the interactive applications and which are independent of the client system resources. At the client, the received documents are mapped to the client system resources to thereby perform interactive applications using the client system resources. Accordingly, client-server communications may take place for many different types of clients in a device independent and transfer optimized manner. Changes to the applications may be provided on the server only.

According to a preferred embodiment of the present invention, server documents which represent the interactive applications are generated at the server by generating a page setup and a page information content which are independent of client system resources. The generated page setup and the generated page information content are transmitted from the server to the client. At the client, a client document is generated from the transmitted page setup and page information. The client document is also independent of the client system resources. Also at the client, a document page which is dependent on the client system resources is generated from the client document. The document page is presented on the client, using the client system resources, to thereby perform the interactive applications.

According to another aspect of the invention, a particular terminal device can be used on the client side to enable multimedia presentations which are independent of the underlying client hardware. In particular, the client terminal device can provide self-configuration with respect to an application with specific hardware requirements.

An underlying concept of the invention is to describe documents for interactive conversation independent of the client system resources for presentation of the respective (document) pages, and to determine only substantial functional features for the page set up. In order to allow all possible system resources for presentation of applications, the description of conversation (dialog and expected responses) preferably is limited to only functional aspects such as the minimum necessary user interaction devices (buttons, etc.) which are used to run an application.

The actual presentation set up preferably is generated by a hardware specific resource management device located in the client. This device determines the possible modes of interaction by a user, for instance via a keyboard, a touchscreen, or by software emulated buttons. This device can be further responsible for the presentation of abstract functional multimedia elements on the client side. In a preferred embodiment, this management device is implemented as a resource adaptation software layer provided between the network and the client presentation device such as the client display. An application then need only utilize the user input mechanisms which can be implemented by the respective presenting client.

Before transmission of conversation-relevant information between the server and the client, the documents are described by separating page set up information, which is only used for set up of a page on the client side and not used for an actual user conversation itself, and page information contents which is related to user conversation with an application and which is transmitted at later stages of conversation. This page set up information can be provided on the client side before starting a real conversation, for instance by precaching that information on the client side.

The invention, therefore, allows an application on a server system to present conversations at remote clients which comprise various different system resources for the presentation. Further changes for an application or amendments in an application need only be fulfilled on the server side and not at all clients. The aforementioned drawbacks of underlying communication networks preferably are taken into account by the intelligent caching mechanism and by efficient protocols which can reduce the transmitted information, and thus enhance performance of mobile computing. Partial components of a document may be cached on the client side. Preferably, a static cache for caching document information which is preloaded and not changed over the run time of an application, and a dynamic cache for caching information being collected during runtime of the application, are both provided. These two cache memories can be controlled by a cache manager.

In an object-oriented programming embodiment, the page set up information can be advantageously represented by functional objects and presentation objects, wherein the functional objects can be defined independently of a client presentation hardware platform. By using the proposed architecture, adaptation of a document to a specific client hardware can be accomplished automatically and transparent to the user.

In a further embodiment of the invention, particular objects for multimedia presentation of a document are provided which are related, for example, to voice, button, screen set-up, etc. Abstract multimedia functional elements can be further provided to enable a multimedia presentation which automatically adapts to initially unknown multimedia resources of a client.

A presentation of a document (page) need not be restricted to a page that is visible on a computer display. Moreover, there need be no limitations for implementation of multimedia components like sound, motion pictures, etc.

The transmitted information stream can be further compressed and expanded in order to minimize the bandwidth for the transmission. Bidirectional information flow between the server and a client can be advantageously provided in order to enable transmission of specific information needed on the server side for running an application, such as server accesses due to user queries on the client side. For example, a client can inform the server about its system resources for presenting multimedia presentation objects.

The present invention can be advantageously implemented by using expansible boxes which are independent of the display format of a client and which can be automatically adapted to that format, while maintaining the relative dimensions of the boxes to each other. Each box can include a multimedia presentation object, wherein the meaning of an expansible box depends on the respective server and is determined by the respective application. In a preferred embodiment of the invention, these boxes are provided at successive lines of a document.

Dialog masks presented on the client side often comprise input arrays where, in contrast to an intermediate transmission of a whole document from the client to the server, only a small portion of the dialog mask may need be updated. For instance, in case of a medical application, clicking on a field in the array causes a list of health insurance companies to appear where one of these companies can be selected for a further stage of the dialog. This may be accomplished by use of so-called "auto-send fields" which are sent from client to the server without any interaction by the user.

BRIEF DESCRIPTION OF THE DRAWINGS

FIGS. 4A and 4B are two snapshots of the same application dialog presented on two clients, which provide different system resources for presentation of the respective dialog masks.

DETAILED DESCRIPTION OF PREFERRED EMBODIMENTS

Figure 1:
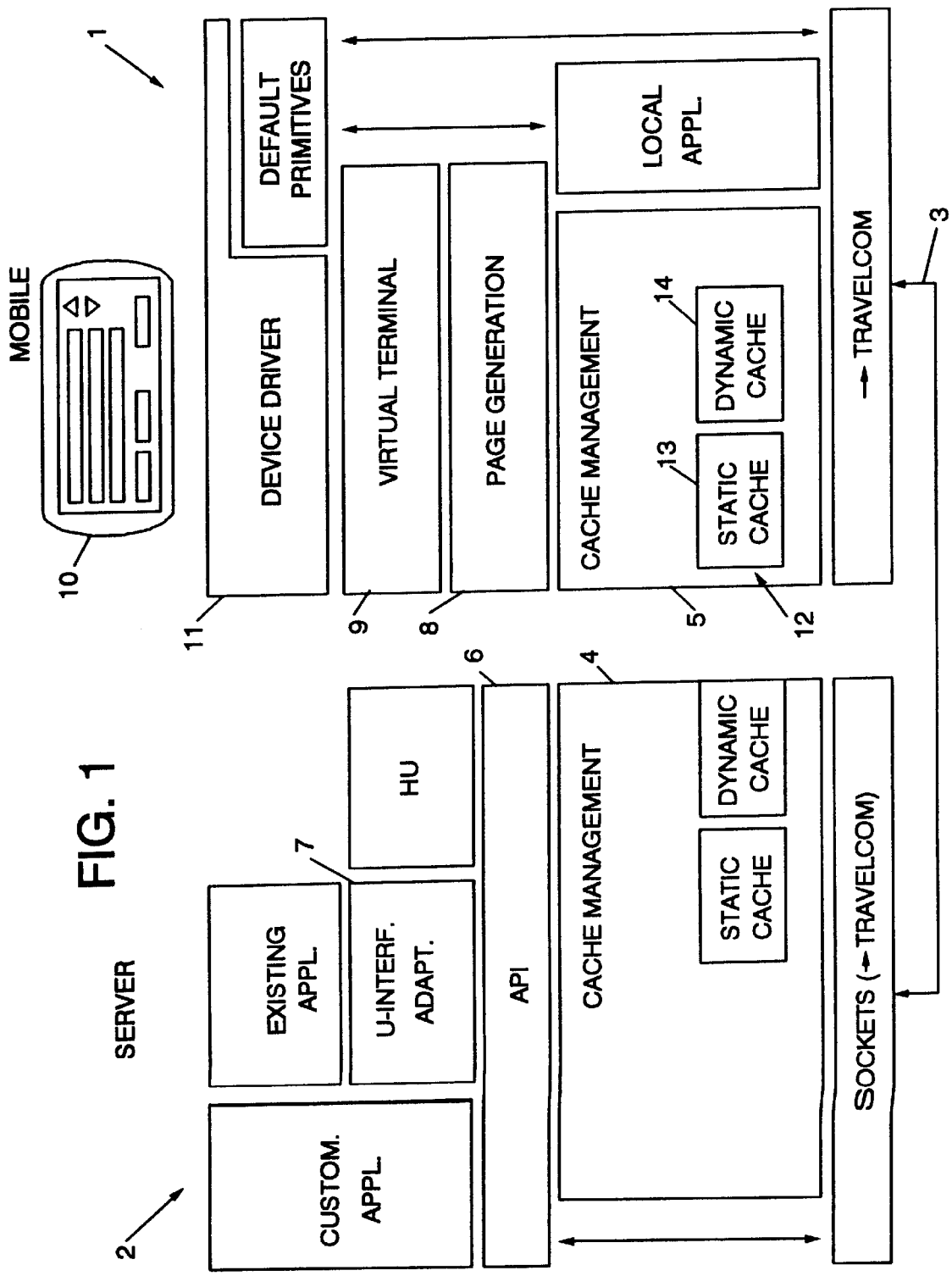
FIG. 1 is a block diagram illustrating a preferred architecture according to the invention where a mobile client is connected to a stationary application server.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices.

Accordingly, the present invention may take the form of an entirely hardware embodiment, an entirely software embodiment or an embodiment combining software and hardware aspects.

It will be understood that each block of the drawings, and combinations of blocks in the drawings, can be implemented by computer program instructions. These program instructions may be provided to a processor to produce a machine, such that the instructions which execute on the processor create means for implementing the functions specified in the block or blocks. The computer program instructions may be executed by a processor to cause a series of operational steps to be performed by the processor to produce a computer implemented process such that the instructions which execute on the processor provide steps for implementing the functions specified in the block or blocks.

Accordingly, blocks of the drawings support combinations of means for performing the specified functions, combinations of steps for performing the specified functions and program instruction means for performing the specified functions. It will also be understood that each block of the drawings, and combinations of blocks in the drawings, can be implemented by special purpose hardware-based systems which perform the specified functions or steps, or combinations of special purpose hardware and computer instructions.

Client-Server Architecture

FIG. 1 illustrates a preferred architecture of a client-server system where a mobile client 1 is communicating with a stationary server 2, which can be any server-suitable computer system. The server and the client are interconnected via a wireless network 3. However, the invention is not restricted to radio networks. Telecomnmunication networks such as the Integrated Switching Digital Network (ISDN) or other wide area networks (WANs) or local area networks (LANs) as the Internet or private Intranets may be used. Infrared (IR) light controlled communication networks as provided in stores may also be used.

Running an application generally involves information exchange between the server and the client with respect to the presentation of the application on the client side, in particular its conversational presentation. This information can be divided into information related to the set up of the presentation, and information exchanged by user interactions which can be regarded as information contents of a document. Those information streams pass through cache management modules 4, 5 which are provided on the server 2 and the client side 1, respectively. For any cached information, only the reference information need be transmitted. An exception for information which does not have to traverse the cache management modules 4, 5, is basic control and command (query) information exchanged between the server 2 and the client 1.

Further provided is an Application Program Interface (API) 6 by which all kinds of applications can be run on the server, either by direct utilization of the API, or by insertion of an adaptation layer 7 which can be used, for example, for a Host-PC communication.

The transferred information stream is advantageously reduced with respect to already cached information on the client side 1. Over a wireless radio transmission line 3, the information stream is transferred to the mobile client 1. The cache management module 5 on the client side 1 expands the stream again to the original shape. For document contents information, the expanded stream is interpreted by a page generation module 8 and forwarded to a virtual terminal module 9. The virtual terminal module builds up a real (document) page based on the abstract and functional description of the page, which is presented on the existing client's hardware 10 by means of a hardware dependent device driver unit 11.

In this embodiment, the device driver unit 11 also provides a number of presentation primitives by which additional notifications can be presented by the client terminal, which are presented independent of the virtual terminal module 9. For example, caution signals, telemetry data, etc. can be presented. Thus, local applications provided by the client, such as applications for querying of telemetry data like engine data of an automobile, or global positioning system (GPS) data, can be handled. These data can also be presented by means of the presentation primitives of the device-dependent driver unit 11.

Document Description

According to the invention, description of a document, i.e. set-up and the information contents, is performed in an abstract and device independent manner with regard to the respective presentation resources of a client. A concrete physical meaning of a document is provided at first when presenting it, for instance as a page, on a client terminal device 10. The appearance of the presentation can vary with the presentation capabilities of the respective client. However, the fundamental elements and therefore the functionality of a document survive due to the abstract description.

There are many embodiments for generating a document according to the present invention. In a first embodiment, generation can be accomplished in a pure textual form by means of a formal description language. In another embodiment, it is realized by construction of the page elements by means of respective API functions. Accordingly, the respective data structures for internal representation of a document are generated explicitly within the program code of the application, while the description is converted to the internal page presentation by the formal language using a parser.

In the above embodiment, documents are subdivided into a static portion which corresponds to a dialog mask used to control the retention or elimination of portions of a pattern of characters corresponding to a conversational dialog between an application and a user, and a second dynamic portion corresponding to the contents of input and output fields of a document or actual selections of fields by a user. Before the transmission, both portions may be produced in only one document, but are separately handled in the transmission phase. For a static portion of a document already being provided (i.e. cached 12) on the client side 1, only the dynamic information need be transmitted to the client, to be inserted in an existing mask.

In this embodiment, a document is described by a number of superimposed lines. Each line includes at least one side-by-side disposed box which automatically expands to the provided presentation format and which corresponds to at least one shaping element like output information (e.g. text) or an input field. The height of a line is determined by the largest included box. The boxes within a line can be centered with respect to that maximum line height, or can be presented at the top or bottom of a line.

Boxes presented within a line are arranged side by side, but can also be expanded to the maximum width of the widest line, but generally no more than the maximum physical width format of the respective client's presentation device. This is illustrated with reference to FIG. 2, where the overall width is determined by the width of the second line 22. The box 20 presented in the first line is expanded to that width. Dummy (empty) expansible boxes 23 in front of or appended to presented functional boxes, such that functional boxes are presented in a centered or right-aligned position. Each AUTO_FILL (expansible) box may take up an equal percentage of the left free space with respect to the total number of existing AUTO_FILL boxes in the same line (row), thus allowing arbitrary, yet device independent positioning of a box.

In addition, a box may not only contain functional elements, it can also contain a number of lines, or another logical page. Thus, recursive nesting is possible. Thus documents can be arbitrarily designed without impact on the intended system resource independency.

The actual physical size of a (document) page generated by the above description language concept may be exclusively determined by the presenting device on the client side. Therefore, from an application point of view, absolute presentation sizes are not specified. Only the character width or the number of lines used for input and output fields can be determined within distinct limitations. The final size depends on the character set at the client.

Each expansible box represents the frame for one or more individual functional elements of a described document. Conversations can be designed by combining these elements. The elements of the above preferred embodiment are depicted in Table 1 which is only exemplary, as all kinds of multimedia components can be involved which can be supported by the respective client hardware.

TABLE 1

| Field type | Attributes | |
| --- | --- | --- |
| Static output field for outputting non-variable text as part of the dialog mask | output-text word changeover (True, False) | Character size (Large, Medium, Small) Character style (Normal, Emphasis, Attention) color (Normal, Intense, Light) Alignment (Left, Center, Right) Field width by characters(1 . . . n, AUTO FILL Field height by characters 1 . . . n) |
| Dynamic output field for outputting variable text as part of the presented information | output-text word changeover (True, False) | |
| Input field for inputting alphanumeric data. Input can be restricted to specific data types, or even made obscure in case of input of a password. Further a predetermined text can be inserted. | Type (numeric, alpha, capitals, invisible, date, protected word changeover (True, False) Auto-activation (True, False) predetermined Text | |
| Selection field (1 of n) enabling selsection of one item in a list of multiple items. | Title List of selectable items Auto-activation (True,False) Popup (True,False) | |
| Selection field (m of n) enabling selection of multiple elements from a respective list. | Title List of selectable items | |
| Button for interacting with an application server. | Labelling | |

By specifying a field width of "AUTO_FILL", the respective expansible box is broadened so that the whole line width is extended to the width of the broadest line, but no more than the physical width of the presenting display. If more than one field contains this parameter, all these boxes are expanded proportionally. The 'auto-activation' attributes for the input field and the 1 of n selection field means that any selection or input verification is treated as activation of a button, i.e. a corresponding message is sent to the server. A formal description language for an implementation of these functions is presented below.

Each field element comprises a number of attributes wherein parts of these attributes are similar for all field types, and others are specific for each field or for a number of fields. For fields which no width and/or height are determined, the respective box size is calculated from the presented field content. In the case of a predetermined width and/or height of a field, for instance as a multiple of a standard character line of the chosen character set, a spacious presentation is—dependent on the field type—cut, broken down, or manually scrolled into a visible portion of the presentation space.

In FIGS. 4A and 4B, display presentations of an application dialog mask on two different client terminal devices 40, 41 are shown, these clients having different system resources for presentation of documents. The device in FIG. 4A comprises a display area 42, three function keys 43, 44, 45 for the respective actions "OK", "Cancel" and "Func", and arrow keys 46 for display navigation. On the display, a current snapshot of an application dialog window is shown.

In contrast, the terminal device depicted in FIG. 4B comprises a display 47 of different shape and size, and instead of the function keys 43, 44, 45 and the arrow keys 46, eight function keys ("F1–F8") 48, and a trackball 49 for display navigation are included.

As can be seen from FIG. 4B, the application window 47 includes an upper portion 50 which displays a number of computer parts like a monitor type, a motherboard type or a type of soundcard. In a further window portion 51, for each item in the upper window 50 the available background information is displayed. An item can be selected by pushing the "F1" button, or cancelled by pressing the "F2"button, as the user is informed at the bottom part 52 of the display. The user can scroll through the upper display window by means of the trackball 49 wherein the actual item is highlighted by means of a cursor bar connected to a scroll bar (slider) 53. It is emphasized that in case of the terminal device 41 of FIG. 4B, the required interactive means ("OK" and "Cancel" functions) are mapped to the physical existing function keys 48. The mapping is also displayed on the screen 47 in the additional information line 52 at the bottom of the display 47.

The display area 42 of the device 40 shown in FIG. 4A has a smaller size compared with the display 47 shown in FIG. 4B. As a consequence, a further slider 54 is displayed on the right side of the display 42, since the current page needs more vertical space than is physically provided by the client's terminal 40.

Page Description Language

A formal description language will now be described by which the above functionality can be implemented. By this formal language, conversational dialogs and interactive features can be advantageously described. An exemplary dialog shown in FIG. 3 can be described according to the following pseudo code:

```
(* Dialog for entry of patient data *)
DOCUMENT REPLIES(OK, CANCEL, FO:"Help")
    ROW (* Title of dialog *)
        STATIC FONT_SIZE(LARGE) FONT_COLOR(INTENSE)
            H-ALIGN(CENTER) WIDTH(AUTO_FILL)
            TEXT(*Data of patients*)
    ROW (* Name of patient *)
        STATIC TEXT("Name:")
        INPUT IDENTIFICATION("name") WIDTH(AUTO_FILL)
    ROW (* Address/Street *)
        STATIC TEXT ("Street:")
        INPUT IDENTIFICATION("street") WIDTH(AUTO_FILL)
    ROW (* Address/Place *)
        STATIS TEXT("postcode:")
        INPUT IDENTIFICATION("postcode") WIDTH(5) INPUT_TYPE(NUMERIC)
            MAX_INPUT(5)
        STATIC TEXT("Place:")
        INPUT IDENTIFICATION("place") WIDTH(AUTO_FILL) HEIGHT(2)
    ROW (* Selection of sickness insurance fund *)
        RADIO POPUP IDENTIFICATION("kk") TEXT("sickness insurance fund:")
            LIST_ITEM("Name of a sickness insurance fund":S, "Engineer", "United")
```

The exemplary document is configured for the return of standard responses "OK", "CANCEL", and "F0" of a user. The presentation of these responses on the client's terminal depends on the respective hardware resources. If the client hardware provides appropriate functional elements for these functions, e.g. functional keys of a keyboard, no additional elements need to be presented on the client display. On the other hand, if the client does not provide such keys, the respective functions can be presented on the client's display.

A formal language for describing a document will now be illustrated. Only basic data types are mentioned for purposes of clarity.

```
document="DOCUMENT"[reply][row]
reply="REPLIES""("stdButton[:string](","stdButton
    [:string])")"
stdButton=("OK"|"CANCEL"|"NO"|"PREV"|"NEXT"|"F"
    ("0"–"9"))
row="ROW"{box}
box=[vAlign]fieldDescr
fieldDescr=
    (staticOutputField|dynamicOutputField|inputField|radio
    ChoiceField|multiChoiceField|buttonField)
staticOutputField="STATIC"[fontSize][fontStyle]
    [fontColor][width][height][hAlign][text][noWordWrap]
dynamicOutputField="DYNAMIC"[fontSize][fontStyle]
    [fontColor][width][height][hAlign][text][noWordWrap]
    [identification]
inputField="INPUT"[fontSize][fontStyle][fontColor]
    [width][height][hAlign][text][noWordWrap][maxInput]
    [identification][typeList][autoActivate]
radioChoiceField="RADIO""[fontSize][fontStyle]
    [fontColor][width][height][hAlign][text][identification]
    [itemList][autoActivate][popup]
multiChoiceField="MULTI""[fontSize][fontStyle]
    [fontColor][width][height][hAlign][text][identification]
    [itemList]
buttonField="BUTTON"[fontSize][fontStyle][fontColor]
    [width][height][hAlign][text][identification]
vAlign="V_ALIGN""("("TOP"|"CENTER"|"BOTTOM")
    ")"
hAlign="H_ALIGN""("("LEFT"|"CENTER"|"RIGHT")
    ")"
fontSize="FONT_SIZE""("
    ("LARGE"|"MEDIUM"|"SMALL")")"
fontStyle="FONT_STYLE""("
    ("NORMAL"|"EMPHASIS"|"ATTENTION")")"
fontColor="FONT_COLOR""("
    ("NORMAL"|"INTENSE"|"LIGHT")")"
width="WIDTH""("integer|"AUTO_FILL"")"
height="HEIGHT""("integer")"
text="TEXT""("string")"
string=""arbitrary ASCII-string except quotation marks""
noWordWrap="NO_WORD_WRAP"
maxInput="MAX_INPUT""("integer")"
identification="IDENTIFICATION""("string")"
autoActivate="AUTO_ACTIVATE"
popup="POPUP"
typeList="INPUT_TYPE""("type(","type)")"
type=
    ("ALPHA"|"NUMERIC"|"CAPITALS"|"INVISIBLE"
    |"DATE"|"PROTECTED")
itemList="LIST_ITEM""("string[":S"]{","string[":S"]}")"
```

Application Program Interface

For the generation of documents for an application, the following application program interface (API) can be advantageously used. It need only include a few elementary functions which are sufficient for generation of all required structures.

The internal representation of a document can remain obscure to a user. The document stores the static portion of the transmitted information stream (dialog mask) as well as the dynamically changing information which is used as pre-determined text or as explanatory comments for input fields, for defining dynamic output fields, or for user selections in selection fields. This dynamic data exists only in the generation phase of an information stream which is going to be transmitted and may be discarded thereafter. Thus it may be avoided that, after attaching of other dynamic information, previous data are transmitted again. By use of the API, the dynamic portion of a document can be amended at any time and transferred to the client independent of the respective static portion (dialog mask).

The transmitted information stream can be enlarged by control commands and query commands, or further dynamic data, and the complete information packet can be transferred as a block to the client.

Figures 2, 3:
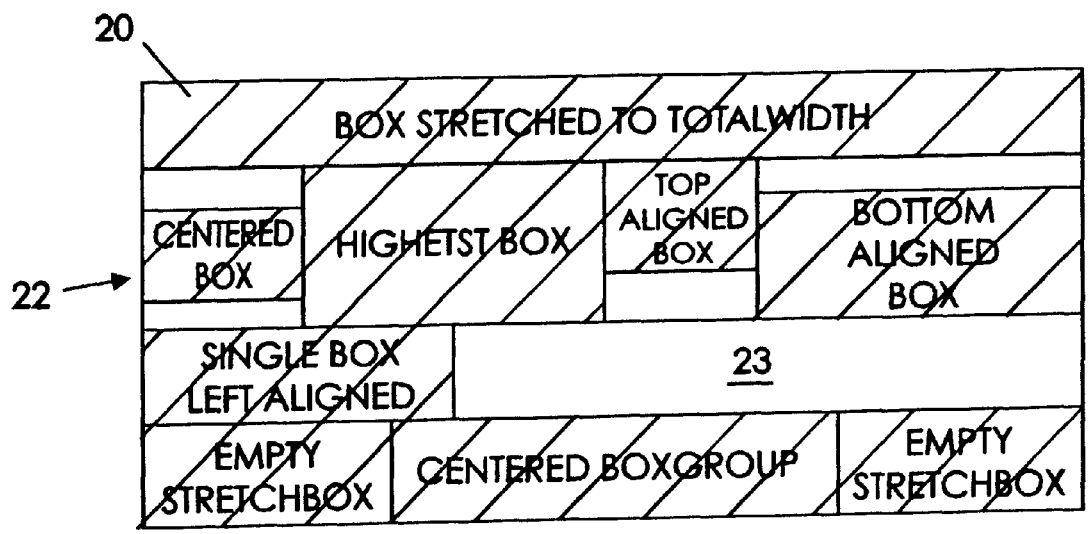
FIG. 2 shows an exemplary document page set up based on expansible boxes.
FIG. 3 shows an exemplary conversation in the field of medical patient information handling.

The following excerpt of program code written in C-language depicts generation of the exemplary conversation (dialog) shown in FIG. 3. The respective attribute names include the allowed description language parameters which are extended by the prefix "TT_". In the medical application depicted in FIG. 3, clicking on the bottom field 30 in the array causes a list of health insurance companies to appear, where one of these companies can be selected for a further stage of the dialog.

```
TTDocHandle doc;
doc ttNewDocument( );
ttAddReply(doc, TT_OK, NULL);
ttAddReply(doc, TT_CANCEL, NULL);
ttAddReply(doc, TT_F0,"Help");
ttAddRow(doc);
ttAddBox(doc, TT_STATIC, TT_DEFAULT);
ttSetAttribute(doc, TT_FONT_SIZE, (AttribValue)
    TT_LARGE);
ttSetAttribute(doc, TT_FONT_COLOR, (AttribValue)
    TT_INTENSE);
ttSetAttribute(doc, TT_H_ALIGN, (AttribValue)
    TT_CENTER);
ttSetAttribute(doc, TT_WIDTH, (AttribValue)
    TT_AUTO_FILL);
ttSetAttribute(doc, TT_TEXT, (AttribValue) "Data of
    Patients")"
ttAddRow(doc);
ttAddBox(doc, TT_STATIC, TT_DEFAULT);
ttSetAttribute(doc, TT_TEXT, (AttribValue) "Name:");
ttAddBox(doc, TT_INPUT, TT_DEFAULT);
ttSetAttribute(doc, TT_IDENTIFICATION, (AttribValue)
    "name");
ttSetAttribute(doc, TT_WIDTH, (AttribValue)
    TT_AUTO_FILL);
ttAddRow(doc);
ttAddBox(doc, TT_STATIC, TT_DEFAULT);
ttSetAttribute(doc, TT_TEXT, (AttribValue) "Street:");
ttAddBox(doc, TT_INPUT, TT_DEFAULT);
ttSetAttribute(doc, TT_IDENTIFICATION, (AttribValue)
    "street");
ttSetAttribute(doc, TT_WIDTH, (AttribValue)
    TT_AUTO_FILL);
ttAddRow(doc);
ttAddBox(doc, TT_STATIC, TT_DEFAULT);
ttSetAttribute(doc, TT_TEXT, (AttribValue) "postcode:");
ttAddBox(doc, TT_INPUT, TT_DEFAULT);
ttSetAttribute(doc, TT_IDENTIFICATION, (AttribValue)
    "postcode");
ttSetAttribute(doc, TT_WIDTH, (Attribvalue) 5);
ttSetAttribute(doc, TT_INPUT_TYPE, (AttribValue)
    TT_NUMERIC);
ttSetAttribute(doc, TT_MAX_INPUT, 5);
ttAddBox(doc, TT_STATIC, TT_DEFAULT);
ttSetAttribute(doc, TT_TEXT, (AttribValue) "Place:");
ttAddBox(doc, TT_INPUT, TT_DEFAULT);
ttSetAttribute(doc, TT_IDENTIFICATION, (AttribValue)
    "place");
ttSetAttribute(doc, TT_WIDTH, (AttribValue)
    TT_AUTO_FILL);
ttSetAttribute(doc, TT_HEIGHT, (AttribValue) 2);
ttAddRow(doc);
ttAddBox(doc, TT_RADIO. TT_DEFAULT);
ttSetAttribute(doc, TT_IDENTIFICATION, (AttribValue)
    "sickness insurance fund");
ttSetAttribute(doc, TT_POPUP,NULL);
ttSetAttribute(doc, TT_TEXT, (AttribValue) "Sickness
    Insurance Fund:");
ttSetAttribute(doc, TT_LIST_ITEM, (AttribValue) "Name
    of a sickness insurance fund");
ttSetAttribute(doc, TT_LIST_ITEM, (AttribValue)
    "Engineer");
ttSetAttribute(doc, TT_LIST_ITEM, (AttribValue)
    "United");
ttSetAttribute(doc, TT_SELECT_ITEM, (AttribValue) 0);
```

The functions of the API will now be listed. The possible return codes can be gathered from the respective comments of the API header files designated "tt_api.h".

TTDocHandle ttNewDocument(void)

This function is used for generation of a new empty document. The returned handle must be denominated for all operations on that document. (In contrast to a "pointer", a "handle" is an abstract reference (term) to an object.)

int ttFreeDocument(TTDocHandle handle)

For each document internally a number of resources will be allocated. In case of that document not needed any longer, these resources can be completely released again by this function.

int ttFreeDynamic(TTDocHandle handle)

This function releases all dynamic data of a document and will be performed automatically when the dynamic part of a document has been inserted in an information stream by a function "ttAddDyn2DataStream".

TTDocHandle ttParseDocument(char *string)

When a TTDL document is provided in a null-terminated buffer (C-string), it can be converted into a document handle by means of this function. After a successful conversion, this function delivers a document handle.

char *ttLastParseError(void)

This function delivers a pointer to a string which specifies the respective last error during scanning or parsing a document.

TTDocHandle ttReadDocument(char *filename)

When a TTDL format is provided by a text file, it can be converted by this function into the internal format. After successful read and conversion a document handle is returned.

int ttWriteDocument(TTDocHandle handle, char *filename)

By way of this function, a document provided by the document handle can be written into a file as TTDL text document.

int ttAddReply(TTDocHandle handle, int button, char *modifier)

Herewith a standard response button can be determined for a document. If no modified title is required, a respective 'null' pointer must be denominated.

int ttAddRow(TTDocHandle handle)

This function appends a new empty line to a document.

int ttAddBox(TTDocHandle handle, int fieldType, int v_align)

This function inserts a new box right-aligned into an actual line of a document. If no specific vertical adjustment of the box is desired, as default value "TT_DEFAULT" must be denominated. Furthermore the type of the contained functional element, i.e. "TT_STATIC", "TT_DYNAMIC", "TT_INPUT", "TT_RADIO", "TT_MULTI", or "TT_BUTTON", must be declared.

int ttSetAttribute(TTDocHandle handle, int attrib_type, AttribValue Value)

By this function all attributes of a functional element of an actual, at last created or with "ttSetCurrentBox" set box can be determined.

int ttSetCurrentBox(TTDocHandle handle, char 'id)

Hereby a box with an identification "id" can be set actual, and thus further operations like "ttSetAttribute" relate to that box. This function can only be applied to boxes for which a respective identification attribute has been defined in the construction phase of the box.

TTDataStreamHandle ttOpenDataStream(void)

By this function a data stream according to the invention can be established. Afterwards, this information stream can be filled up with arbitrary documents, or dynamic control and query data, and then transmitted.

void ttCloseDataStream(TTDataStreamHandle ttds)

A no more required data stream can be released by delivering its handle together with associated resources to this function.

int ttAddDoc2DataStream(TTDataStreamHandle ttds, TTDocHandle doc)

The static and dynamic portion of a delivered document hereby can be inserted into a given data stream. Afterwards, the dynamic information of the document is discarded.

int ttAddDyn2DataStream(TTDataStreamHandle ttds, TTDocHandle doc)

The dynamic portion of a delivered document can be inserted into a given data stream by way of this function. The dynamic information is discarded afterwards as beforehand. In case of changes of the dynamic data in a document which shall be transmitted separately to the client in order to insert them into an actual document, these dynamic data even will be the only portion comprised by the data stream.

In Table 2 the possible parameters for the function "ttSetAttribute" are depicted in more detail.

docData=docTag docID length cacheCtrl [reply {row}+](no replies and rows for cacheCtrl >0)
docTag=UCHAR(TTDS_DOC_DATA)
reply=length {replyButton}
replyButton=(buttonId|modifiedButtonId string)
modifiedButtonId=buttonId, logically or'ed with TTDS_BUTTON_MODIFIED
row=length {box}+
box=length fieldTag {attribute}
fieldTag=UCHAR(TTDS_STATIC, TTDS_DYNAMIC, TTDS_MULTI, TTDS_RADIO, TTDS_BUTTON)
attribute=(stringAttrib string|enumAttrib enumVal|dimAttrib dimension|inputTypeAttrib inputType|flagAttrib)
stringAttrib=UCHAR(TTDS_TEXT, TTDS_LIST_ITEM)
enumAttrib=UCHAR(TTDS_BOX_V_ALIGN, TTDS_H_ALIGN, TTDS_FONT_SIZE, TTDS_FONT_STYLE, TTDS_FONT_COLOR)
enumVal=UCHAR(TTDS_BOTTOM, TTDS_CENTER, TTDS_TOP, TTDS_LEFT, TTDS_RIGHT, TTDS_NORMAL, TTDS_LARGE, TTDS_MEDIUM, TTDS_SMALLA, TTDS_EMPHASIS, TTDS_ATTENTION, TTDS_INTENSE, TTDS_LIGHT)
dimAttrib=UCHAR(TTDS_WIDTH, TTDS_HEIGHT, TTDS_MAX_INPUT)

TABLE 2

| Attribute type | Attribute value | Valid elements |
| --- | --- | --- |
| TT_IDENTIFICATION | pointer to string | all |
| TT_FONT_SIZE | TT_LARGE, TT_MEDIUM, TT_SMALL | all |
| TT_FONT_STYLE | TT_NORMAL, TT_EMPHASIS, TT_ATTENTION | all |
| TT_FONT_COLOR | TT_NORMAL, TT_LIGHT, TT_INTENSE | all |
| TT_WIDTH | TT_FILL_WIDTH, 1 . . . n | all |
| TT_HEIGHT | 1 . . . n | all |
| TT_TEXT | pointer to string | all |
| TT_MAX_INPUT | 1 . . . n | |
| TT_NO_WORD_WRAP | Unused | Static, Input, Dynamic |
| TT_POPUP | Unused | Radio |
| TT_AUTO_ACTIVATE | Unused | Radio, Input |
| TT_LIST_ITEM | pointer to string | Radio, Multi |
| TT_INPUT_TYPE | TT_ALPHA, TT_NUMERIC, TT_CAPITALS, TT_INVISIBLE, TT_DATE, TT_PROTECTED | Input |
| TT_SELECT_ITEM | 0 . . . #items-1 | Radio |
| TT_SELECT_ITEM | TT_NO_SELECTION, 0 . . . #items-1 | Multi |

Coding of a Data Stream

By the generation of an information stream the data is coded in order to obtain as compact a transmission packet as possible. All data with a word length greater than 1 byte cause buffered in a "Network Byte Order", i.e. the most significant bytes (MSB) of a word are provided at a lower address. For positive integer numbers, the data type "Packed Unsigned Integer" (PUINT) is used, i.e. 7 bits of a byte are used for the value of a number and the MSB being set means that another byte is following.

The structure of such a data stream is illustrated as follows by a notation similar to the above code examples. Any comments are set brackets and presented cursive at the respective end of a line.

packet=counter{(docData|dynamicData|control)|
counter=UCHAR(incremental counter of sequential packets MOD256)
inputTypeAttrib=UCHAR(TTDS_INPUT_TYPE)
inputType=UCHAR, Bitfield(Bit 0:TTDS_ALPHA, 1:TTDS_NUMERIC, 2:TTDS_CAPITALS; 3:TTDS_INVISIBLE, 4:TTDS_DATE, 5:TTDS_PROTECTED)
flagAttrib=UCHAR(TTDS_NO_WORD_WRAP, TTDS_AUTO_ACTIVATE, TTDS_POPUP)
dynamicData=dynDataTag docID length cacheCtrl {dataField}(no data fields for cacheCtrl >0)
dynDataTag=UCHAR(TTDS_DYNAMIC_DATA)
dataField=length fieldAddr fieldValue
fieldValue=(stringFieldTag string|selectionFieldTag {selection})
stringFieldTag=UCHAR(TTDS_DYNAMIC, TTDS_INPUT)
selectionFieldTag=UCHAR(TTDS_RADIO, TTDS_MULTI)
selection=PUINT(position of selected item)

```
control=ctrlTaglength
    (logonRequest|logonResponse|logoff|clearDoc|reset|but-
    tonpressed)
ctrlTag=UCHAR(TTDS_CONTROL_DATA)
logonRequest=logonReqTag logonData
logonReqTag=UCHAR(TTDS_LOGON_REQUEST)
logonData=version hwType logonID sessionID staticCac-
    heId dynCacheSize dynCacheID
version=UCHAR(version of data stream protocol)
hwType=UCHAR(Hardware type, see 1.5.2, page 19 for
    possible values)
logonId=string
sessionId=UCHAR
staticCacheId=crc32(0 means "no static cache")
dynCacheSize=PUINT(max. size in Byte, 0 means "no
    dynamic cache")
dynCacheID=crc32(0 means "use new, empty dynamic
    cache")
logonResponse=logonResponseTag logonResponseData
logonResponseTag=UCHAR(TTDS_LOGON_
    RESPONSE)
logonResponseData=ULONG(Bitmask, see 1.5.2, page 19
    for usage)
logoff=UCHAR(TTDS_LOGOFF)
clearDoc=clearDocTag docID
clearDocTag=UCHAR(TTDS_CLEAR_DOCUMENT)
reset=UCHAR(TTDS_RESET)
buttonPressed=buttonPressedTag docID buttonID
buttonPressedTag=UCHAR(TTDS_BUTTON_
    PRESSED)
docID=UWORD
buttonID=UCHAR(TTDS_OK, TTDS_CANCEL,
    TTDS_YES, TTDS_NO, TTDS_PREV, TTDS_
    NEXT, TTDS_F0 . . . 9)
fieldAddr=rowAddr boxAddr
rowAddr=PUINT
boxAddr=PUINT
cacheCtrl=PUINT(0:new data, >0:cache reference id)
length=PUINT(length of corresponding sequence, exclud-
    ing length-field size)
dimension=PUINT(in units of character width or height, 0 is
    interpreted as −1)
string=length {CHAR}
crc32=ULONG
```

Caching mechanism

In the design phase of a document, the information stream is subdivided into a static and a dynamic portion. These distinct data types are handled in two separate blocks which are cached independently of each other. Thus, for example, dialog masks can be provided entirely on the client side 1 in a static (preloaded) cache memory 13, whereby only the information contents of the masks are transferred.

The caching of transferred information is accomplished transparent to the user during transmission of a first information stream, although the user can influence the cache performance by the selection of individual data blocks in the during the generation phase of a data stream.

Accordingly, the present invention provides a mechanism for performing interactive applications in a client-server based interactive processing system, where these applications are presented at the client by way of documents.

The documents are described independent of the client system resources for presentation of respective document pages, and only substantial functional features and determined for the page set up. In order to allow all possible system resources for presentation of applications, the description of conversation includes only functional aspects such as the minimum necessary user interaction devices which are used to run the application.

The real presentation set up is generated by a hardware specific resource management device located at the client, where the possible modes of interaction by a user are determined. Before transmission of conversation-relevant information between the server and the client, the documents are described by separating page set up information which is only used for set up of a page on the client side, and page information content which is related to the user conversation. The page set up information can be provided on the client side before starting a real conversation, for instance by precaching that information on the client side.

The present invention can be advantageously applied in the arena of mobile computing where a mobile client communicates with an application server over a wireless network. A uniform application is provided on a server system presentation of conversations at remote clients which comprise various different system resources for the presentation. Further changes for an application or amendments in an application can be implemented only on the server side, and not at all clients.

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A method for performing interactive applications in a client-server based dialog system, including a client and a server that communicate with one another, the method comprising the steps of:

generating at the server, server documents that represent the interactive applications, by generating a page set up and a page information content that is separate from the page setup, both of which are independent of client system resources;

independently transmitting the generated page set up and the generated page information content from the server to the client;

at the client, generating a client document from the independently transmitted page set up and page information content by combining the independently transmitted page setup and page information content, the client document being independent of the client system resources;

at the client, generating from the client document a document page that is dependent on the client system resources;

presenting the document page on the client, using the client system resources;

generating a second page information content at the client based upon user input at the client; and transmitting the second page information content from the client to the server to provide an interactive dialog.

2. A method according to claim 1 wherein the step of generating from the client a document page that is dependent on the client system resources comprises the step of mapping the page setup onto the client system resources so as to map functional requirements of the interactive application onto the client system resources.

3. A method according to claim 1 wherein the page setup information is represented by functional objects and presentation objects.

4. A method according to claim 1 wherein the step of generating server documents at the server further comprises the step of caching the page setup and page information content at the server.

5. A method according to claim 4 wherein the caching step comprises the step of statically caching the page setup and dynamically caching the page information content at the server.

6. A method according to claim 1 wherein the step of generating a client document from the transmitted page setup and page information contents further comprises the step of caching the page setup and page information content at the client.

7. A method according to claim 6 wherein the caching step comprises the step of statically caching the page setup and dynamically caching the page information content at the client.

8. A method according to claim 1 wherein the transmitting step is preceded by the step of compressing the page setup and the generated page information content at the server.

9. A method according to claim 1 wherein the step of generating a page setup comprises the step of generating a document including a plurality of boxes therein.

10. A method according to claim 9 wherein the document includes a plurality of lines, and wherein each of the boxes is located in one of the plurality of lines.

11. A method according to claim 10 wherein the box is an expansible box that automatically expands to fill the entire line.

12. A method according to claim 10 wherein the box is a centered box that automatically centers on a line.

13. A client-server system for performing interactive applications comprising:
   a client;
   a server that communicates with the client;
   means in the server, for generating server documents that represent the interactive applications, by generating a page set up and a page information content that is separate from the page setup, both of which are independent of client system resources;
   means for independently transmitting the generated page set up and the generated page information content from the server to the client;
   page generation means in the client, for generating a client document from the independently transmitted page set up and page information content by combining the independently transmitted page setup and page information content, the client document being independent of the client system resources;
   resource management means in the client, for generating from the client document, a document page that is dependent on the client system resources;
   means in the client, for presenting the document page on the client, using the client system resources;
   means in the client, for generating a second page information content, based upon user input at the client; and
   means in the client, for transmitting the second page information content from the client to the server to provide an interactive dialog.

14. A system according to claim 13 wherein the resource management means comprises means for mapping the page setup onto the client system resources so as to map functional requirements of the interactive application onto the client system resources.

15. A system according to claim 13 wherein the means for generating server documents comprises means for caching the page setup and page information content at the server.

16. A system according to claim 15 wherein the caching means comprises:
   static cache means for caching document information which is preloaded and unchangeable during runtime of an application;
   dynamic cache means for caching information which is collected during the runtime; and
   cache management means for controlling the dynamic and static cache means.

17. A system according to claim 13 wherein the means for generating a page setup comprises the means for generating a document including a plurality of boxes therein.

18. A system according to claim 17 wherein the document includes a plurality of lines, and wherein each of the boxes is located in one of the plurality of lines.

19. A system according to claim 18 wherein the box is an expansible box that automatically expands to fill the entire line.

20. A system according to claim 18 wherein the box is a centered box that automatically centers on a line.

21. A computer program product for performing interactive applications between a client and a server that communicates with the client, the computer program product comprising:
   a computer readable storage medium having computer readable code means embodied in the medium, the computer readable code means comprising:
      computer instruction means in the server, for generating server documents that represent the interactive applications, by generating a page set up and a page information content that is separate from the page setup, both of which are independent of client system resources;
      computer instruction means for independently transmitting the generated page set up and the generated page information content from the server to the client;
      computer instruction means in the client, for generating a client document from the independently transmitted page set up and page information content by combining the independently transmitted page setup and page information content, the client document being independent of the client system resources;
      computer instruction means in the client, for generating from the client document, a document page that is dependent on the client system resources;
      computer instruction means in the client, for presenting the document page on the client, using the client system resources;
      computer instruction means in the client for generating a second page information content, based upon user input at the client; and
      computer instruction means in the client, for transmitting the second page information content from the client to the server to provide an interactive dialog.

22. A computer program product according to claim 21 wherein the computer instruction means for generating a document page that is dependent on the client system resources comprises computer instruction means for mapping the page setup onto the client system resources so as to map functional requirements of the interactive application onto the client system resources.

23. A computer program product according to claim 21 wherein the computer instruction means for generating server documents comprises computer instruction means for caching the page setup and page information content at the server.

* * * * *